United States Patent [19]

Bejarano-Wallens et al.

[11] Patent Number: 4,929,456
[45] Date of Patent: May 29, 1990

[54] MELTING TOLERANT SAUCE AND SEASONING PARTICULATE

[75] Inventors: Celso O. Bejarano-Wallens; Julie E. Gage, both of East Windsor, N.J.; Donald Hodapp, Boise, Id.

[73] Assignee: Kraft General Foods, Inc., Glenview, Ill.

[21] Appl. No.: 236,566

[22] Filed: Aug. 25, 1988

[51] Int. Cl.$^5$ .............................................. A23L 1/39
[52] U.S. Cl. ....................................... 426/99; 426/576; 426/589; 426/650; 426/393
[58] Field of Search ................ 426/589, 576, 99, 650, 426/393

[56] References Cited

U.S. PATENT DOCUMENTS

| | | | |
|---|---|---|---|
| 2,906,629 | 9/1959 | Oppenheimer | 426/576 |
| 3,615,645 | 10/1971 | Forkner | 426/576 |
| 3,615,690 | 10/1971 | Lisle | 426/576 |
| 3,697,283 | 10/1972 | Rogers et al. | 426/576 |

FOREIGN PATENT DOCUMENTS

| | | | |
|---|---|---|---|
| 0216668 | 12/1983 | Japan | 426/576 |
| 1132145 | 6/1986 | Japan | 426/576 |
| 1227744 | 10/1986 | Japan | 425/576 |

*Primary Examiner*—Jeanette Hunter
*Attorney, Agent, or Firm*—Thomas R. Savoie; Daniel J. Donovan

[57] ABSTRACT

A process for preparing a melting tolerant portion controlled sauce and seasoning particulate by combining a first mixture of a 5% gelatin solution and seasonings with a second mixture comprising non-solid ingredients such as cream, margarine, cheese, etc. and mixing the combination to form a sauce mixture, followed by heating the sauce mixture to temperatures effective to pasteurize the sauce mixture then depositing individual sauce particulates onto a freezer belt with a drop forming unit drops and freezing same to temperatures ranging from −5° F. to −15° F. following by removing the frozen discrete sauce particulates from the freezer belt for packaging with frozen melts and/or vegetables.

10 Claims, No Drawings

MELTING TOLERANT SAUCE AND SEASONING PARTICULATE

FIELD OF THE INVENTION

The present invention is concerned with a sauce or seasoning particulate. More particular, the present invention is concerned with a small discrete sauce or seasoning particulate which delivers sauce or seasoning to a product for the purpose of offering portion control and a process for preparing same.

BACKGROUND OF THE INVENTION

The frozen food industry presently manufactures and sells frozen vegetables and sauce combination, frozen meat and sauce combination and other like combinations for in-home preparation and use. These products are typically packaged in aluminum, plastic, or paperboard trays or plastic laminate pouches. The sauces presently available are generally coated onto the surface of these food products. Cooks oftentimes find it very difficult and time consuming to accurately dispense and evenly spread a measured quantity of paste-like sauce across the surface of a food product. The problem is accentuated where the cook is preparing a number of such products, and the problem assumes even greater significance in the mass production of uniform food items.

Portion control provides a marketing advantage. Using substrate/sauce combinations in units of single-serving sizes which do not require individual packages is definitely an advantage to the consumer for in-home use since waste and over-cooking due to extended holding at high temperature are eliminated. Packaging in convenient bulk sizes saves packaging costs. U.S. Pat. No. 4,317,840 by Sortwell approaches this problem by enrobing the frozen portions with the heated sauce coating prior to freezing, where, upon freezing the sauce hardens rapidly without cracking or falling off. The frozen coated product may then be apportioned by the consumer into serving sizes depending on need.

The sauce utilized generally varies depending on the desired product. For instance, U.S. Pat. No. 3,681,094 by Rogers et al. discloses a meat product packed in a gravy/sauce mixture. The sauce/gravy mixture has a gelatin base, and is placed at the bottom of a meat container and allowed to set. Upon cooking, the sauce mixture mixes with the exuded juices from the meat to form a gravy. Sauce mixture containing gelatin has also been used to coat vegetables and subsequently chilled to form a gelatinous block, followed by heating to produce a sauce covered vegetable as disclosed in Japanese Patent No. J6 0075-241-A by Nippon Ham KK.

In U.S. Pat. No. 3,615,690 by Schampel, meat, water, seasoning, flavoring materials and gelatin are mixed together, cooked, cooled and pizza cheese is added thereto. The mixture is then solidified in a mold by chilling into a slicable block but become flowable and spreadable upon heating to 110° F. Other references, such as Japanese Patent No. J5 8216-668-A by Nippon Suisan Kaisha, discloses a sauce composition containing 0.5 to 2.0% gelatin which is dropped on meat and solidified. Cooking of the meat will melt the sauce for consumption.

The above references, in general, disclose a variety of sauces, some containing gelatin. None of these references, however, disclose a sauce seasoning blend in the form of frozen particulates which remain individually frozen and free-flowing in any desired increment.

It is, therefore, an object of the present invention to prepare a sauce or seasoning particulate to be added to other frozen food pieces.

Another object of the present invention is to prepare a sauce or seasoning particulate which remains individually frozen and free-flowing in whatever increments desired for packaging.

A further object of the present invention is to prepare sauce or seasoning pieces which allows for easy forming without having to cut into desired sizes and resist melting or deforming at elevated temperatures.

SUMMARY OF THE INVENTION

The present invention is concerned with the preparation of a melting tolerant, portioned controlled sauce and seasoning particulate comprising the steps of:. forming a first mixture comprising 3-14% gelatin solution in water and combining same with a seasoning blend; forming a second mixture comprising non-solid ingredients said non-solid ingredients being a member selected from a group consisting of soy sauce, beef base, sesame oil, mustard, heavy cream, margarine, tomato base, olive oil, mushroom base, lemon juice, processed swiss cheese, parmesan cheese, chicken base and combinations thereof; combining the first mixture in amounts ranging from 50% to 85% with the second mixture in amounts ranging from 10% to 50% by weight and mixing to form a uniform mixture; heating the uniform mixture with agitation for a time ranging from 1 to 5 minutes and at a temperature ranging from 180° F. to 190° F. effective to pasteurize the said mixture; cooling the pasteurized sauce mixture with agitation to a temperature ranging from 70° F. to 130° F.; forming the cooled sauce into sauce particulates of sufficient size and depositing same onto a freezer belt; maintaining the sauce particulate on the freezer belt for a sufficient time to completely freeze said particulate; removing the frozen sauce particulate from the freezer belt; and freezing the sauce particulates to temperatures ranging from −5° F. to −15° F. for packaging.

DETAILED DESCRIPTION

The present invention is concerned with a process for preparing a melting tolerant, portion controlled sauce and seasoning particulate which may be combined with other food pieces and frozen, followed by subsequent removal from the package for cooking.

The sauce composition of the present invention is gelatin/water base which allows for easy forming at refrigeration/freezer temperature which generally occur during normal frozen food distribution. The sauce, however, must melt into an appropriate sauce, broth, filling or the like when properly heated.

The frozen sauce should be in particulate form to enable even distribution of the particulates throughout the blend when combined with other frozen food pieces. It is desired in the present invention that the other food pieces remain separate, individual and unadulterated. Once blended, the sauce and other food pieces may be removed from the package for cooking in any desired increment which is impossible when a liquid sauce is frozen with other fruit pieces in a solid block.

The sauce of the present invention may be prepared from typical gravy ingredients such as water, flour, starch, dairy products such as cheeses, flavorings, spices and the like. In the sauce of the present invention gelatin is an essential ingredient which must be incorporated into the sauce particulate in a particular manner.

The amount of gelatin added may vary depending upon the degree of rigidity desired in the end product, the gel strength of the gelatin used, and the flavor of the desired sauce. When using a relatively high strength gelatin of about 275 bloom, the incorporation of from about 3% to about 14% of such gelatin or the formation of a 3% to 14% gelatin solution gives satisfactory results. Amounts of gelatin substantially less than 14% may result in a sauce particulate of sufficient gel strenth to maintain its form when combined with other frozen food pieces. Although amounts of gelatin in excess of about 14% may be used. We have found that a gelatin of sufficient bloom strength, in amounts in excess of 14% is not necessary to produce the desired result and may become economically disadvantageous. Adding gelatin in an amount ranging from about 3% to about 9% is especially preferred.

The gelatin added may be of various bloom strengths with bloom strength being the weight in grams required to produce 4 millimeter depression in a gelatin gel of standard strength (6.66% wt/wt.) at a fixed temperature by a plunger of fixed dimensions. Such bloom strengths generally vary between 50 and 300 bloom, and we prefer to use the stronger bloom strength gelatins of about 200 to 300 bloom, and preferably 275 bloom. Gelatin of bloom strength from 50 to 200 can be used, but use of these gelatins may be economically unfeasible because of amounts of gelatin required and time required for the gelatin to set.

The first step in the preparation of the sauce particulate is the formation of a gelatin solution. This is accomplished by adding the desired quantity of gelatin to water. The water must be heated above room temperature in order to fully solubilize the gelatin within a reasonable time period. In the present invention, the water may be heated before the gelatin is added, or the gelatin may be added to tap water which may then be heated in order to fully dissolve the gelatin. In the present invention the water is heated to a temperature ranging from 130° F to 160° F. prior to the addition of the gelatin. It is preferred, however, that the water be heated to about 145° F., while stirring the mixture until the gelatin is fully dissolved.

After the gelatin has been fully dissolved the other dry ingredients may then be slowly added to the gelatin solution and to avoid clumping, stirring or recirculation is continued. The other dry ingredients may include Swiss cheese powder, mustard flour, ground basil, cayenne pepper, garlic powder, onion powder, nutmeg, xanthan gum, black pepper, basil leaf, marjoram, dry sherry powder, hydrolyzed vegetable protein (HVP), sugar, whole thyme, parsley, minced green onion and combinations thereof, depending on the desired flavor of the sauce particulate.

Simultaneously with the preparation of the gelatin solution, the remaining non-solid ingredients are combined in a heating recepticle and melted into a slurry. It is preferred that the receptacle be steam jacketed, with a scrape surface agitator to avoid excessive burn-on. The remaining semi-solid ingredients may include soy sauce, ginger, heavy cream, mustard, margarine, beef base, chicken base, sesame oil, lemon juice, olive oil, mushroom base, tomato base, orange juice concentrate, orange oil, and $\beta$-carotene, Swiss cheese, parmesan cheese and the like and combinations thereof, depending on the desired flavor of the sauce particulate.

The gelatin containing mixture in amounts ranging from 50% to 85% and preferably from 56% to 84% by weight is then combined with the melted non-solid slurry in amounts ranging from 10% to 50% and preferably from 15% to 45% by weight depending on the desired finish products to form a sauce mixture. The sauce mixture is then heated with agitation to a temperature ranging from 170° to 190° F. and preferably from 175° to 185° F. and held at the temperature for a time ranging from 1 to 5 minutes. Said time/temperature relationship being effective to pasteurize the sauce mixture. The length of time the sauce is held is dependent upon the temperature to which the sauce is heated. For instance, if the sauce is heated to 185° F., the holding time necessary for pasteurization is about one minute.

After the pasteurization step, the sauce is then cooled to a temperature near the gel temperature of the sauce mixture. The cooling temperature should generally ranges from 70° F. to 130° F. At this temperature range, the sauce mixture is still fluid and flowable, which facilitates formation of sauce particulate on the freezing belt. Cooling of the sauce can be accomplished by passing pre-chilled water through the jacket of the recepticle. Care should be taken to avoid cooling the sauce below the gelatinization temperature. However, the sauce should be sufficiently cooled to allow the particulates to maintain the desired shape and form when deposited on the freezer belt.

The cooled sauce, having temperatures ranging from 70° to 130° F., is then transferred to a drop-forming machine which forms the sauce into particulates and deposits same onto a moving freeze belt. The drop forming processing parameters are different for each sauce. For instance, the diameter of the sauce particulate formed generally range from about 6 mm to about 15 mm and preferably from about 10 to about 14 mm. The height of the particulate should range from 3 mm to 7 mm and preferably from 5 mm to 6 mm.

The temperature of the cooled sauce prior to drop forming, the pressure exerted on the sauce during drop forming, the viscosity of the sauce, the nozzle bar and diameter of the drop forming machine, and, the outer shell of the nozzle are all factors which affect the ability the produce the sauce particulate. Typically, the temperature of the sauce prior to drop forming generally ranges from 70° F. to 130° F. The temperature will vary depending upon the sauce being prepared. However, care should be taken to insure that the temperature is maintained within the prescribed range.

The pressure exerted on the sauce within the drop forming machine is also essential in producing the desired particulate. The size of the sauce particulate is affected by the pressure, i.e., the higher the pressure to greater the amount of sauce deposited on the freeze belt. Pressures ranging from about 4 psig to about 40 psig are suitable. However, preferred pressure range from about 5.0 psig to about 20.0 psig.

The viscosity of the sauce controls the rigidity of the particulate when the sauce is deposited on the freezer belt. Too low a viscosity would prevent the formation of a chip sauce particulate, while too high a viscosity would make it impossible to make deposits on the freezer belt, and generally result in plugging of the nozzle. The sauce viscosity should generally range from 1,500 to 40,000 centipoisses and preferably from about 1,500 to about 12,000 centipoisses.

The size of the nozzle generally controls the size of the sauce particulate and is most often affected by the pressure and viscosity. The nozzle diameter should generally range from 2 mm to 5 mm and preferably from about 2.5 mm to about 5 mm. The nozzle bar functions to equalize the pressure of the sauce as it passes from the nozzles to the outer shell. In the outer shell are located small orafices from which the cooled sauce is deposited on the freezer belt. The size of the nozzle bar should generally range from 2.5 mm to 5 mm and preferably from about 2.5 mm to about 5.0 mm. The outer shell and orifices therein should be of sufficient size to accommodate sauce having a particle size of up to 2.0 mm and particle concentration of up to 0.84% without plugging. Typically, the size of the outer shell should range from 2.5 mm to 5.0 mm and, preferably, from about 3.0 mm to about 4.0 mm.

The type of machinery suitable for use in the present invention is a Rotoformer ® or other type of drip forming machines. Drop forming machines are generally used in the chemical, drug and food industry. However, its use in the food industry has been limited to the manufacturing of chocolate chips and pellets. In these instances, the temperatures used in depositing the drops are generally in excess of 200° F. The utilization of a drop forming machine in the present invention is the first time this type of machinery is utilized in the formation of gel particulates wherein the particulates are deposited at a low temperature on a freezer belt. Further, no one in the chemical, drug and food industry have utilized a drop forming machine for the production of a sauce particulate, wherein the sauce contains solid particles. Its use has normally been restricted to non-solids application. The introduction of solid particles would often time cause plugging of the nozzles resulting in a manufacturers nightmare. In the present invention certain modification were made to the drop forming machine and the processing parameter which made it possible to run sauce having particle size up to 2.0 mm and particle concentration as high as 0.84%.

Sauce particulates, having the desired dimension and in sufficient amount, are deposited on a freezer belt by the drop forming machine. The drop forming processing parameters are different depending on the type of sauce particulate desire. The above factors such as sauce particulate size, temperature, pressure, viscosity, nozzle diameter etc. will be manipulated to produce the desired end product. Once deposited on the belt freezer, the chips are frozen to a temperature ranging from $-5°$ F. to about $-15°$ F. Achieving this temperature is generally dependent upon the temperature within the freezer, and the residence time therein. Cooling within on the freezer belt is accomplished by utilizing chilled brine on the underside of the freezer belt. The incoming brine should have temperatures ranging from $-40°$ F. to $-45°$ F. and the outgoing brine should have temperature ranging from $-36°$ F. to $-38°$ F. Also, to improve the freezing efficiencies above the belt, a blast of cold air is applied on top of the product. The desired temperature is generally accomplished by varying the residence time. If the particulate temperature is above the desired temperature, the residence time is increased, and if lower the time is decreased. Suitable residence time ranges from about 1 to about 5 minutes.

As the sauce particulate passes through the freezer, it is cooled to a temperature sufficiently low to allow the gelatin to "set". By "set" is meant, a rigid mass which is attained by cooling gelatin a temperature around freezing. The temperature at which the gelatin will set may vary within fairly wide ranges depending upon the bloom strength of the gelatin. Since no cutting or forming is necessary after the sauce is deposited on the freezer belt as in the prior art; the necessity for creating a semi-rigid pliable mass does not exist. Hence, the particulate can be frozen to lower temperatures without affecting manufacturing efficiencies.

The frozen sauce is removed from the freezer belt in the form of discrete sauce particulate. There is no need to further slice and/or dice as in the prior art. The particulates are further frozen to temperatures ranging from 0° F. to $-15°$ F. for packaging.

These sauce particulates may then be combined with frozen foodstuffs, such as frozen meats and vegetable enabling even distribution throughout the blend with the vegetable and meat pieces remaining separate, individual and unadulterated at all times. Once blended, the sauce particulates and other food pieces may be removed from a package for cooking in any desired increment, a feature which is not available when a liquid sauce is frozen with other food pieces.

The gelatin base sauce particulates allows for easy forming and resists melting or deforming at elevated temperatures which might occur during frozen distribution. These frozen sauce particulates will melt into liquid sauce, gravy, filling or the like when properly heated for eating.

The following examples will further illustrate the features of the present invention.

EXAMPLE I

Oriental Sauce

To a 350 gallon tank 2143.8 lbs. of water was added. The water temperature was 145° F.±15° F. One hundred and fifty pounds (150 lbs.) of gelatin was added to the tank and the mixture agitated for about 10 minutes until a uniform mixture was formed. The remaining dry ingredients such as modified corn starch in amounts of 207.00 lbs., garlic powder in amounts of 30.00 lbs., ginger in amounts of 6.90 lbs., and xanthan gum in amounts of 0.9 lbs. were added to the gelatin solution and the combination mixed for an additional 5 minutes until a uniform mixture is formed.

Simultaneous with the preparation of the gelatin mixture, non-solid ingredients such as soy sauce in amounts of 390 lbs., sesame oil in amounts of 12 lbs., wine flavor in amounts of 9.0 lbs. and beef base in amounts of 50.4 were combined in a tank equipped with scrape surface agitation and heated to temperatures of 140° F. and until a uniform mixture is formed.

The melted mixture of non-solid ingredients was then combined with the gelatin mixture and the combination heated with scrape surface agitation to 185° F. The heated product was then transferred to a holding tube and held for one minute for pasteurization then to a precooling scrape surface heat exchanger where it was cooled to 80°±5° F.

The cooled sauce was then transferred to a Rotoformer where the sauce particulates were formed and deposited onto a freezer belt simultaneously. The sauce particulate formed had a diameter of 12 mm and a height of 5 mm.

The formed sauce particulates were then frozen as they passed through the freezer to a temperature of $-12°$ F. The frozen sauce particulates were scraped from the freezer belt and packaged or combined with frozen vegetable and/or meat and packaged.

EXAMPLE II

White

To a 350 gallon tank 1213.2 lbs. of water was added. The temperature was 145° F. One hundred and fifty (150 lbs.) pounds of gelatin was added to the tank and the mixture agitated for 10 minutes until the gelatin was completely dispersed. The remaining dry ingredients such as modified corn starch in amounts of 183.0 lbs., salt in amounts of 50 lbs., dry mustard flour in amounts of 15 lbs., spices in amounts of 27.6 lbs. and xantham gum in amounts of 0.9 lbs. were added to the gelatin solution and the combination mixed for an additional 5 minutes until a uniform mixture was formed.

Simultaneous with the preparation of the gelatin mixture, non-solid ingredients such as heavy cream in amounts of 600.0 lbs., margarine in amounts of 120.0 lbs., Swiss cheese in amounts of 427.5, parmesan cheese in amounts of 150 lbs. chicken base in amount of 28.8 lbs. and Swiss cheese flavor in amounts of 24.00 were combined in a tank and mixed according to Example I.

The melted mixture of non-solid ingredients was the combined with the gelatin mixture and further processed according to Example I. The frozen sauce particulate produced was packaged or combined with frozen vegetables and/or meat and packaged.

What is claimed is:

1. A process for preparing a melting tolerant, portioned controlled sauce and seasoning particulate comprising the steps of:
   (a) a first mixture comprising a 3–14% gelatin solution in water and combining same with a seasoning blend;
   (b) preparing a second mixture comprising non-solid ingredients selected from a group consisting of soy sauce, beef base, sesame oil, mustard, heavy cream, margarine, tomato base, olive oil, mushroom base, lemon juice, processed swiss cheese, parmesan cheese, chicken base, cheese flavors and combinations thereof;
   (c) combining the first mixture in amount ranging from 50% to 85% to the second mixture in amounts ranging from 10% to 50% by weight and mixing to form a uniform mixture;
   (d) heating the said uniform mixture with agitation for a time ranging from 1 to 5 minutes and at a temperature ranging from 180° F. to 190° F. effective to pasteurize the said mixture;
   (e) cooling the pasteurized sauce mixture with agitation to a temperature ranging from 70° F. to 130° F.;
   (f) depositing the cooled sauce onto a freezer belt to form particulate drops of sufficient size to provide portion control;
   (g) maintaining the particulate drops on the freezer belt for sufficient time to freeze said particulate drops to temperatures ranging from −5° F. to −15° F.;
   (h) removing the frozen sauce particulate drops from the freezer belt; and,
   (i) freezing to temperatures ranging from 0° F. to −15° F. for packaging.

2. A process according to claim 1 wherein the gelatin solution has a concentration of about 5% solution.

3. A process according to claim 1 wherein the first mixture in amounts ranging from 56% to 84% by weight is combined with the second mixture in amounts ranging from 15% to 45%.

4. A process according to claim 1 wherein the gelatin bloom ranges from 200 to 300.

5. A process according to claim 5 wherein the gelatin bloom is 275.

6. A process according to claim 1 wherein the sauce mixture is heated to temperatures ranging from 170° F. to 190° F. to effect pasteurization.

7. A process according to claim 1 wherein the sauce mixture is heated for a time ranging from 1 to 5 minutes to effect pasteurization.

8. A process according to claim wherein the sauce particulate drops deposited on the freezer belt has a diameter ranging from 10 to 14 mm and a height ranging from 5 to 6 mm.

9. A process according to claim 1 further comprising individually quick freezing the discrete particulate drops to temperatures ranging 0° F. to −15° F. prior to packaging.

10. A process according to claim 1 further comprising combining the frozen particulates drops with meat and-/or vegetable for packaging.

* * * * *